Aug. 14, 1962  J. TATLOCK ET AL  3,049,485
SUPPORT STRUCTURES

Filed April 17, 1958  4 Sheets-Sheet 1

INVENTORS
JOHN TATLOCK
JOHN ALEXANDER FORBES GLASS
BY Larson and Taylor
ATTORNEYS

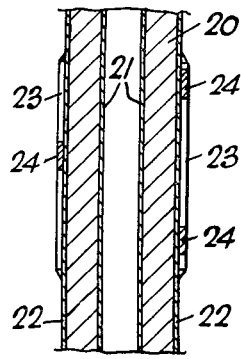
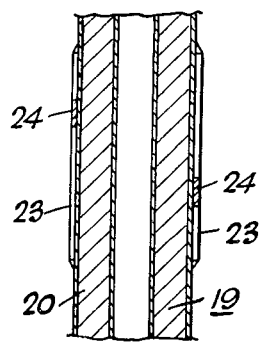
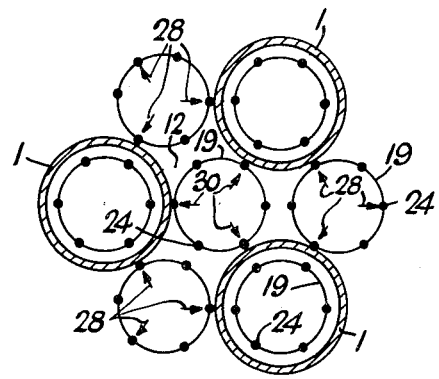
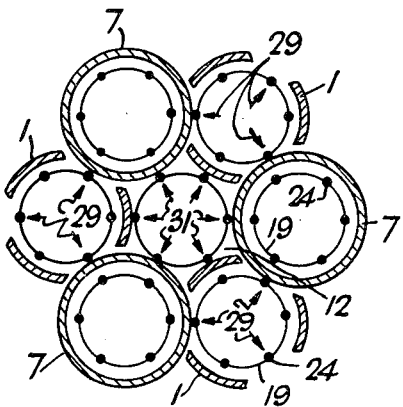

3,049,485
SUPPORT STRUCTURES
John Tatlock, Culcheth, near Warrington, and John Alexander Forbes Glass, Woolton, Liverpool, England, assignors, by mesne assignments, to the United States of America as represented by the United States Atomic Energy Commission
Filed Apr. 17, 1958, Ser. No. 729,127
7 Claims. (Cl. 204—193.2)

This invention relates to support structures and it provides a support for a nest of rods or tubes part-way along their length.

The invention has a principal application to the support of fuel elements in the core of a nuclear reactor of the kind known as a "fast reactor" wherein the fuel elements are highly enriched in fissile fuel and are closely nested together. A fast reactor is disclosed in our co-pending U.S. application Serial No. 664,414, filed June 7, 1957.

In a fast reactor core, displacement of the fuel elements, such as by random bowing or by movement which is an aggregation of operational tolerances causes instability during reactor operation due to the change in the distribution of fuel within the core. Such displacement can be controlled by the use of a conventional tube-plate part-way along the length of the fuel elements. However a tube-plate offers a substantial impedance to coolant flow through the core and introduces a zone of high coolant velocity where the coolant has to pass through the narrow passages between fuel elements and tube-plate.

It is one object of the present invention to provide support for fuel elements in a fast reactor core part-way along their length in a manner offering less restriction to fluid flow over the elements than that offered by a tube-plate.

A support structure according to the present invention comprises a nest of tubes having means holding them in face contact with one another on hexagonal sections in the tubes and the tubes intersecting with one another in other sections of greater area than the area of the hexagonal sections, the tubes having their centres corresponding with the corners of a symmetrical hexagonal lattice and arranged so that around any hexagon of the lattice tubes of greater length alternate with tubes of lesser length and arranged so that the tubes are fixed longitudinally to one another by their intersecting positions.

Figure 1:
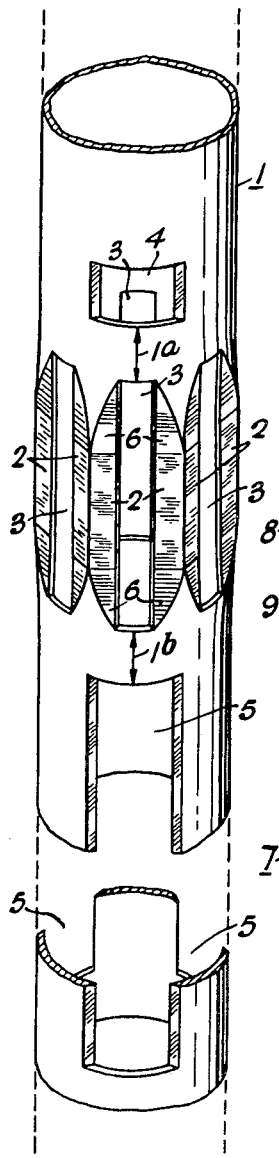
Figure 2:
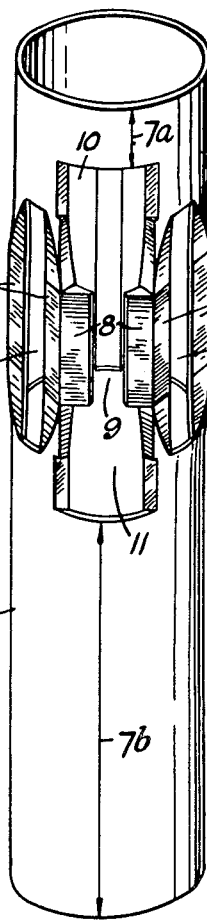
Figure 3:
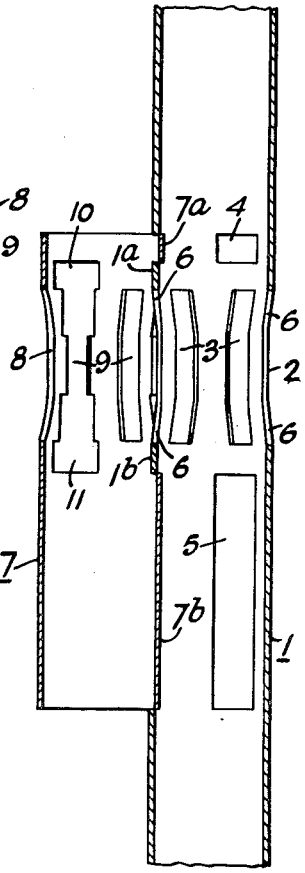
Figure 4:
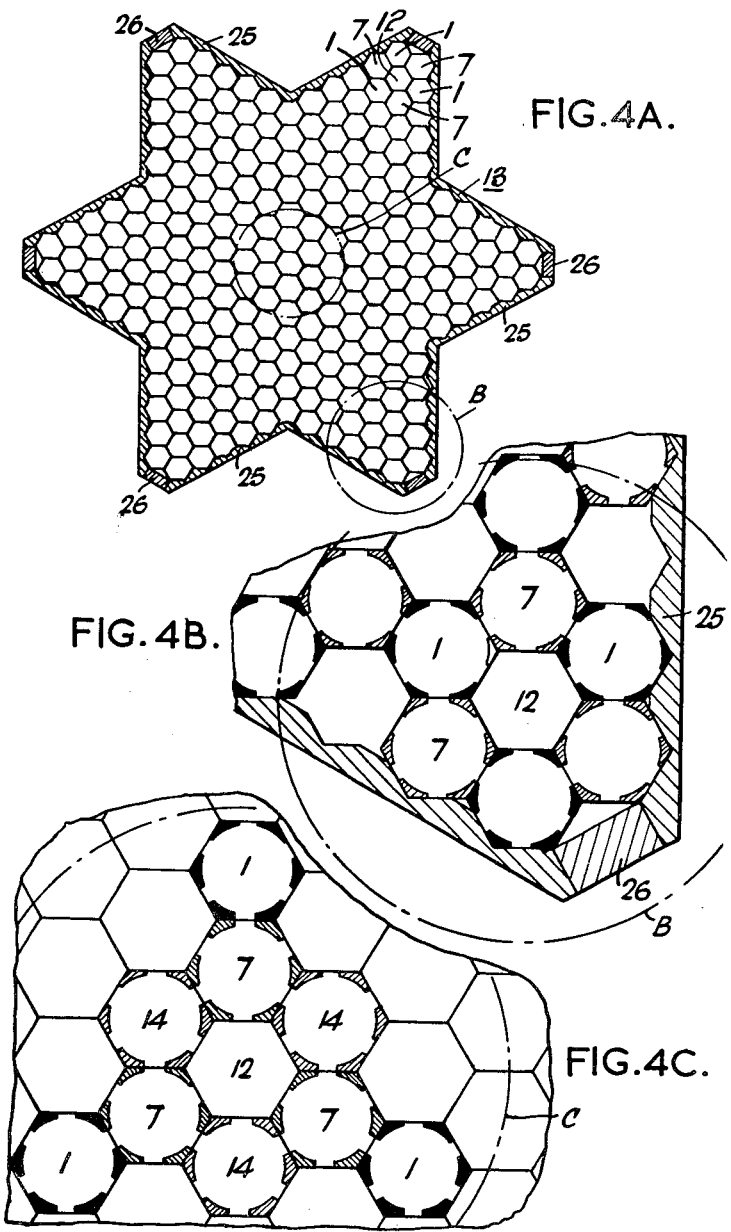
Figure 5:
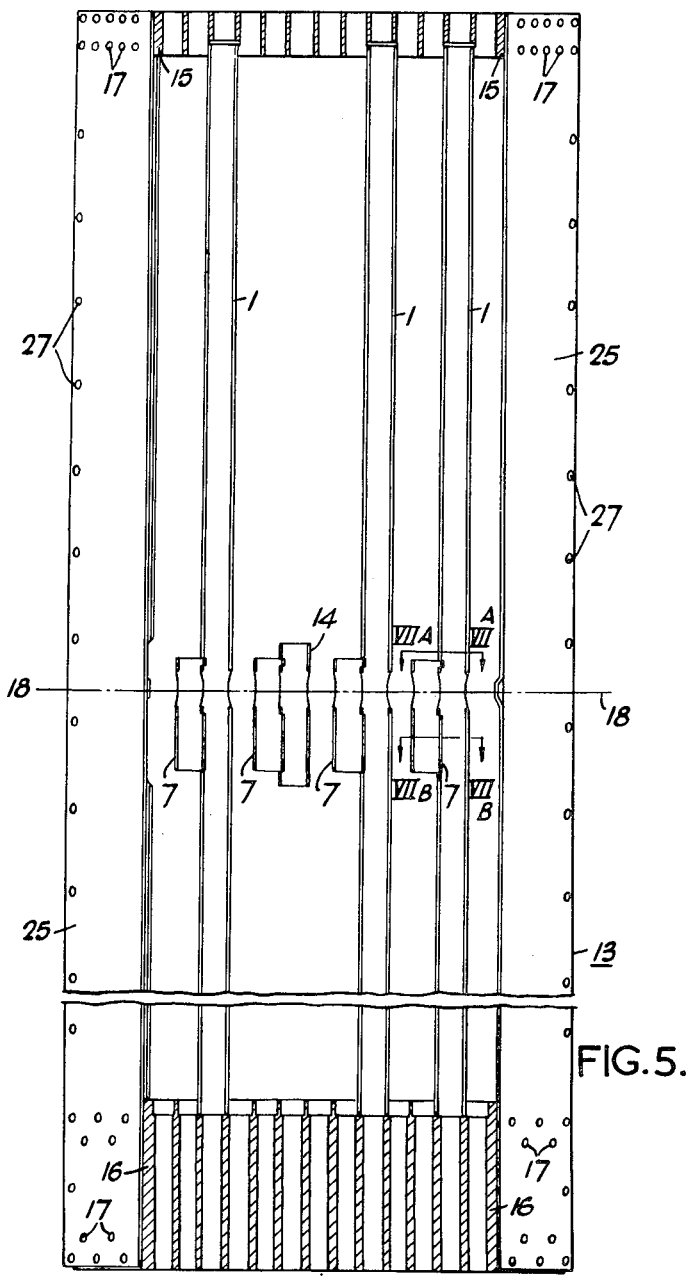

A fast reactor core structure embodying the invention will now be described with reference to the accompanying drawings wherein:

FIG. 1 is a perspective view of a tube of greater length;
FIG. 2 is a perspective view of a tube of lesser length;
FIG. 3 is a sectional elevation of a tube of lesser length engaged with a tube of greater length;
FIG. 4A is a sectional plan view at the centre line of the core structure;
FIG. 4B is an enlarged view of the portion enclosed by the circle B in FIG. 4A;
FIG. 4C is an enlarged view of the portion enclosed by the circle C in FIG. 4A;
FIG. 5 is a sectional elevation of the core structure;
FIG. 6 is a sectional elevation of part of a tubular fuel element;
FIG. 7A is a part section along the line VIIA—VIIA in FIG. 5 and shows fuel elements diagrammatically, and
FIG. 7B is a part section along the line VIIB—VIIB in FIG. 5 and shows fuel elements diagrammatically.

In FIG. 1 a tube 1, 34.4 inches long, has six flat external faces 2 forming a regular hexagon, each face 2 having a central vertical slot 3. The tube 1 has three equispaced shallow slots 4 and three equispaced deep slots 5, the slots 4 being aligned above, and the slots 5 being aligned below, alternate faces 2. Curved surfaces 6 exist above and below the faces 2, as the tube 1 changes from hexagonal to circular section.

In FIG. 2 a tube 7, 3.8 inches long, has six flat external faces 8 forming a regular hexagon, each face 8 having a central vertical slot 9. The tube 7 has three equispaced stepped-slots 10 and three equispaced stepped-slots 11, the slots 10 being aligned above, and the slots 11 being aligned below, alternate faces 8.

The tube 7 is designed to engage with tube 1 in the following manner: the face 8 of the tube 7 shown in FIG. 2 having the slot 10 above it and the slot 11 below it contacts with the face 2 of the tube 1 shown in FIG. 1 having the slot 4 above it and the slot 5 below it. The portion 7a of the tube 7 above the slot 10 engages in the slot 4, the slot 10 accommodates the portion 1a of the tube 1 below the slot 4 and also the top curved surface 6, the slot 9 aligns with the slot 3, the slot 11 accommodates the portion 1b of the tube 1 above the slot 5 and also the bottom curved surface 6, and the portion 7b of the tube 7 below the slot 11 engages in the slot 5. FIG. 3 shows in section the tube 7 engaged with the tube 1 and shows in particular the engagement of the parts 7a, 7b of the tbue 7 in the slots 4, 5 of the tube 1 and the accommodation of the parts 1a, 1b of the tube 1 in the slots 10, 11 of the tube 7.

FIGS. 4A and 4B show the core structure comprising a nest of the tubes 1, 7 having their centres at the points of inter-section of a symmetrical hexagonal lattice and arranged around the lattice so that the tubes 1 alternate with the tubes 7, contacting one another at their respective flat faces 2, 8 (FIGS. 1 and 2) and forming central hexagonal holes 12. The tubes 1, 7 are surrounded by a star shaped core skirt 13 comprising six angled plates 25 and six plates 26. At the centre of the core structure the tubes 1 are replaced by tubes 14, as shown in FIG. 4C. The tubes 14 are 6.3 inches long.

In FIG. 5 the tubes 1 are located at their top ends in a top tube-plate 15 and at their bottom ends in a bottom tube-plate 16, the plates 15, 16 being secured in the core skirt 13 by screws 17. The plates 25 are secured to the plates 26 (FIG. 4A) by screws 27. The tubes 7 are ararnged to engage with the tubes 1, 14 in the region of the centre line 18 of the core structure. The core structure is erected by assembling the nest of tubes into the plates 15, 16 and finally erecting the core skirt 13 around the nest of tubes and the plates 15, 16.

In FIG. 6 a tubular fuel element 19 comprises tubular enriched uranium fuel 20 enclosed by inner and outer sheaths 21, 22. The outer sheath 22 has bands 23 of six integral helical fins 24, the bands 23 being arranged symmetrically about the centre point of the fuel 20. The fuel element 19 is of the type disclosed in U.S. Patent No. 3,030,291, issued on April 17, 1962.

FIGS. 7A and 7B shows, diagrammatically, three of the fuel elements 19 (with their fins 24) housed in three of the tubes 7, three of the fuel elements 19 (with their fins 24) housed in three of the tubes 1 and one of the fuel elements 19 (with its fins 24) housed in the central hole 12 formed by the three tubes 1 and the three tubes 7.

In use, the core structure is charged with fuel elements, each tube 1, 7, 14 and each hole 12 housing one of the fuel elements 19 which are located at their top and bottom ends by the plates 15, 16. The top bands 23 of fins 24 are at a level immediately above the portions 7a of the tubes 7 when the fuel elements 19 are charged into the core structure, and the bottom bands 23 of fins 24 are at the level of the portions 7b of the tubes 7. The fins 24 of the top bands 23 of the fuel elements 19 in the tubes 7 contact the walls of adjacent tubes 1 as shown by arrows 28 (FIG. 7A). The fins 24 of the bottom bands 23 of the fuel elements 19 in the tubes 1 contact the walls of adjacent tubes 7 as shown by arrows 29 (FIG. 7B). The fins 24 of the top bands 23 of the fuel elements 19 in the holes 12 contact the walls of adjacent tubes 1 as shown by arrows 30 (FIG. 7A) and the fins 24 of the bottom bands 23 of the fuel elements 19 in the holes 12 contact the walls of adjacent tubes 1, 7 as shown by arrows 31 (FIG. 7B). The hexagonal lattice arrangement of the tubes 1, 7, 14 at the centre line 18 of the core structure provides positive central location of the tubes and hence of the fuel elements 19, whilst the slots 3, 9 facilitate coolant flow through the core structure.

The holes of the plates 15, 16 are off-set (towards their central holes) relative to the symmetrical hexagonal lattice at the centre line 18 of the core structure by 0.03 inch so that the fuel elements 19 when charged into the core structure are bowed concave as viewed from the centre of the core structure, i.e. a "barrelling" effect is achieved, only the three central holes being in line. This ensures that convex bowing, which would increase the reactivity of the assembled core, should not take place. The tubes 14 facilitate charging of the fuel elements 19 at the centre of the core structure.

The circular sections of the tubes 1, 7, 14 all have an internal diameter of 0.923 inches and an outside diameter of 1.013 inches. The hexagonal sections of the tubes 1, 7, 14 all have measurements of 0.923 inch between parallel flat faces and an internal diameter of 0.87 inch. The length of the sides of the symmetrical hexagonal lattice is 0.923 inch. The length of the flat faces 2, 8 is 0.6 inch. The bands 23 have an outside diameter of 0.828 inch and are 2.4 inches in length. The fins 24 have a helix angle of 70°. The portions 7b of the tubes 7 are 2.4 inches in length.

We claim:

1. In a fast reactor core, end plates, full length open-ended tubes extending in longitudinally parallel spaced-apart relationship between said end plates, short open-ended tubes interposed between each of said full-length tubes and an adjacent full-length tube to form a zone of lateral rigidity intermediate said plates, corresponding hexagonal sections on both said full length tubes and said short tubes, said hexagonal sections being of lesser area than the remainder of the tubes, said hexagonal sections being disposed intermediate the ends of the tubes and at points wherein tube pairs are engaged in face to face contact, one of the tubes of each of said pairs being slotted to accommodate the intersecting portion of the other tube of the pair whereby to support the short tubes in said zone.

2. In a fast reactor core comprising a tube assembly of open-ended short tubes interspersed in longitudinally parallel relationship with open-ended long tubes, a fuel element contained with clearance within each of said tubes, said short tubes and said long tubes having a external section comprising flat contact faces and of lesser area in outline than the remainder of the respective tube, the tubes of said assembly being engaged with one another by face to face contact of the respective sections, one of each pair of adjacent tubes of said assembly being slotted to receive the intersecting portion of the other tube of the pair, the intersecting portion bearing against the fuel element contained in the slotted tube for locating such element therein.

3. A fast reactor core structure comprising an assembly of longitudinally parallel open-ended tubes of greater length and tubes of lesser length, said tubes of greater length arranged with their centres corresponding to the corners of a symmetrical hexagonal lattice and arranged so that around any one hexagon of the lattice tubes of greater length alternate with tubes of lesser length and define a central space bounded by the six tubes of that hexagon, a retaining skirt round said tube assembly, said skirt holding each peripheral tube in face contact with two adjacent tubes and each of the other tubes in face contact with three adjacent tubes on hexagonal sections defined on tubes intermediate their ends, means defining slotted portions in the tubes at sections of the tubes of greater area than the area of the hexagonal sections, the tubes intersecting adjacent face-contacting tubes at said slotted portions for longitudinal location of the tubes, end plates between which said skirt extends, means defining perforations in said end plates corresponding to each of said tubes and spaces, and fuel elements disposed with clearance in said tubes and spaces, the fuel elements extending between said end plates and being located by the intersecting portions of the adjacent tubes intruding through the slotted portions.

4. A fast reactor core structure as claimed in claim 3, wherein the tubes have means defining slots in the hexagonal sections to give inter-communication between the tubes.

5. A fast reactor core structure as claimed in claim 3, wherein the tubes are of circular section other than in the hexagonal sections, the circular sections all having an internal diameter substantially equal to the length of the sides of the symmetrical hexagonal lattice and the same outside diameter, and the fuel elements all having substantially the same dimensions.

6. A fast reactor core structure as claimed in claim 5, wherein each fuel element has a sheath having a series of bands spaced apart on the sheath, each band comprising a set of regularly spaced helical fins, at least one of the bands of fins being located by one of the intersecting portions of the tubes.

7. A fast reactor core structure as claimed in claim 5, wherein said perforations in said end plates are off-set relative to the symmetrical hexagonal lattice whereby the fuel elements are bowed concave as viewed from the centre of the structure.

References Cited in the file of this patent

UNITED STATES PATENTS

| 2,780,596 | Anderson | Feb. 5, 1957 |
| 2,902,422 | Hutter | Sept. 1, 1959 |

OTHER REFERENCES

Harrer et al.: "International Conference on the Peaceful Uses of Atomic Energy," Vol. 3, pages 250–255, August 1955, U.N. Publication, N.Y.

TID 7529 (part 1) Book 1, pages 249–252, November 1959 papers given at a conference in N.Y., on November 1 and 2, 1956. Technical Information Service Extension, Oak Ridge, Tenn.